Feb. 21, 1939. E. A. LEACH 2,148,302
TEMPERATURE COMPENSATED INDUCTANCE COIL
Filed July 23, 1935

Inventor:
Edward A. Leach,
by Harry E. Dunham
His Attorney.

Patented Feb. 21, 1939

2,148,302

UNITED STATES PATENT OFFICE 2,148,302

TEMPERATURE COMPENSATED INDUCTANCE COIL

Edward A. Leach, Schenectady, N. Y., assignor to General Electric Company, a corporation of New York Application July 23, 1935, Serial No. 32,746

22 Claims. (Cl. 171—242)

My invention relates to inductance coils, and more particularly to a means for compensating inductance coils against variations in the inductance thereof due to temperature variations.

It is an object of my invention to provide an improved temperature compensating device for inductance coils which is of simple and economical construction and which is exceedingly positive and reliable in operation.

An additional object of my invention is to provide a device of the above character which may be easily and quickly attached to or detached from its associated coil for adjustment, inspection and repair.

A further object of my invention is to provide a temperature compensating device of the type described which includes novel means operable independently of temperature variations for changing the degree of compensation for a given temperature variation.

A still further object of my invention is to provide in a mechanism for compensating an inductance coil against changes in inductance due to temperature variations, means for shielding the metal working parts of the mechanism thereby to reduce hysteresis and eddy current losses in said parts due to the magnetic field generated within the coil.

In accordance with my invention compensation is effected by arranging a closed circuited conductor within the coil to be compensated and rotating the conductor in response to temperature variations thereby to change the inductive coupling between the conductor and the turns of the coil; the change in the inductive coupling being calibrated to compensate for the change in the inductance of the coil caused by displacement of the turns thereof incident to temperature fluctuations.

Accordingly it is a further and more specific object of my invention to provide a temperature compensating device of the character stated which includes a closed circuited conductor inductively coupled to the turns of an inductance coil and arranged to be rotated by a temperature responsive mechanism to maintain the inductance of the coil substantially constant irrespective of variations in the temperature of the coil.

Figure 1:
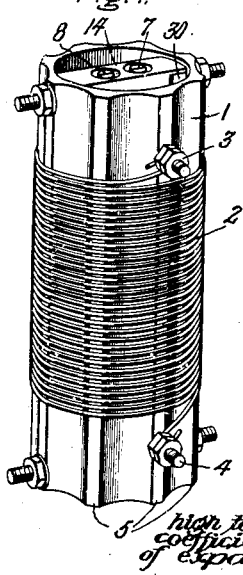
Figure 2:
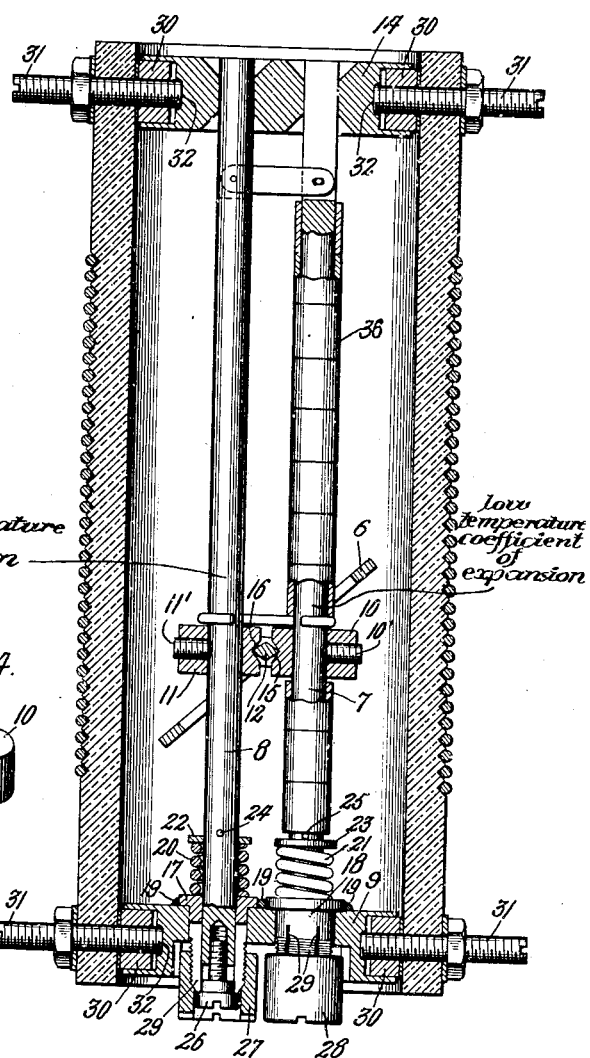
Figure 3:
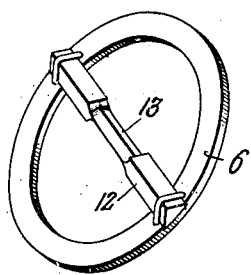
Figure 4:
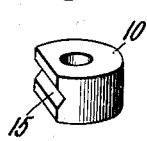

The novel features which I believe to be characteristic of my invention are set forth with particularity in the appended claims. My invention itself, however, both as to its organization and the method of operation, together with further objects and advantages thereof, will best be understood by reference to the following specification taken in connection with the accompanying drawing in which Fig. 1 is a perspective view of an improved inductance coil having my invention embodied therein; Fig. 2 is a cross-sectional view illustrating the working parts of my improved temperature compensating device, and Figs. 3 and 4 show in perspective the details of certain of the elements shown in Fig. 2.

Referring to Fig. 1 of the drawing, I have shown an improved inductance coil as comprising a hollow coil supporting member 1 upon which is wound a conductor 2 having its respective ends connected to two binding posts 3 and 4. The supporting member 1 is preferably constructed of a suitable insulating material, such as porcelain, having a low temperature coefficient of expansion and is provided around its outer periphery with a plurality of ribs 5 having circumferential grooves cut therein for retaining the turns of the coil in fixed spaced apart relation.

In the construction of the above described coil, one end of the conductor 2 is connected to the binding post 3 after which the conductor is wrapped or wound under tension around the surface of the member 1. It will, of course, be understood that during the winding operation, the turns of the coil are guided to fall in the grooves of the ribs 5 so that when the coil is completed the turns thereof will be located in evenly spaced apart positions. When the last turn is in place the conductor 2, still under tension, is wrapped around the remaining binding post 4 and is soldered, or otherwise integrally united thereto. After the solder has hardened, the tension on the conductor is released and the excess of the conductor is clipped adjacent the binding post 4.

By maintaining the conductor 2 under tension until the end thereof is firmly soldered to the binding post 4, a uniform tension is secured in all of the turns of the coil which tends to produce a solid structure highly resistant to dislocation of the turns caused by mechanical stress or jar. In this manner, the likelihood of change in the inductance value of the coil, due to a dislocation of the turns thereof, is substantially minimized. However, it has been found that with a coil of the above described construction, changes in the temperature of the supporting member 1 and in the turns of the coil are attended with a change in the physical dimensions of the coil which, of course, means an undesired variation in the inductance value of the coil.

In accordance with my invention, the above noted inductance changes, due to temperature variations, are compensated for by the provision of a temperature responsive mechanical device for variably increasing or decreasing the inductance of the coil by an amount substantially equal to the decrease or increase in the inductance value caused by a change in the physical dimensions of the coil.

The details of the temperature compensating device are illustrated in Fig. 2, wherein I have shown the compensating means as comprising a short-circuited conductor, or annular ring 6, mounted within the supporting member 1 in inductively coupled relation with the turns of the coil and arranged in such manner that the inductive coupling is variable by a temperature responsive mechanism supported within the hollow interior of the member 1. The temperature responsive actuating mechanism comprises a pair of dissimilar metal rods 7 and 8 mounted on a transverse supporting member 9 and arranged to transmit relative movement therebetween to the conductor 6 through bearing members 10 and 11 adjustably mounted by means of set screws 10' and 11' on the rods 7 and 8. The bearing members 10 and 11 cooperate with a shaft 12, which is connected at its two ends to the conductor 6 and forms a diametrical axis therefor. The pair of rods 7 and 8 are constructed of materials having different temperature coefficients of expansion, such that with one end of each of the rods maintained in a fixed position with respect to the supporting member 9, the free portions thereof move longitudinally in the same direction under like temperature changes. Preferably one of the rods as for example the rod 8 is made of an aluminum copper manganese alloy having a high temperature coefficient of expansion while the other rod is constructed of an iron nickel alloy having a low temperature coefficient of expansion. In order to prevent spreading of the free ends of the rods 7 and 8, a transverse guide member 14 is provided having apertures therein through which the free ends of the rods extend. Due to the different temperature coefficients of expansion of the rods 7 and 8, a relative movement between the free portions thereof will occur as the temperature of the rods fluctuates. Such relative movement is transmitted to the member 6 to rotate the same through the bearing members 10 and 11 and the shaft 12. Thus increase in temperature of the coil causes rod 8 to expand more than rod 7 thereby rotating element 6 clockwise, increasing its coupling with the coil 2 and, hence, reducing the inductance of coil 2.

In the preferred embodiment of my invention the element 6 is provided with a cross member, or shaft, 12, having a diamond-shaped central portion 13 as indicated in Fig. 3, which portion is mounted within opposed V-shaped slots 15 and 16 cut in the bearing members 10 and 11. The member 10 having the slot 15 cut therein is illustrated in perspective in Fig. 4. It will be observed that the knife edges of the diamond-shaped portions engage the apexes of the V-shaped slots so that with relative movement between the apexes, caused by axial expansion and contraction of the rods 7 and 8, the shaft 12 is rotated and rotary motion is transmitted to the closed-circuited conductor 6.

In the operation of the above described device and with alternating current flowing through the turns of the inductance coil whereby the overall inductance value of the same is influenced by the inductively coupled closed-circuited conductor 6, an increase or decrease in the temperature of the turns of the coil due to the current flowing therethrough and to ambient temperature fluctuations, results in some change in the physical dimensions of the coil and a coincident change in the inductance value thereof. However, the rods 7 and 8 being in close physical relation with the turns of the inductance coil, are also caused to expand or contract by the temperature variations which cause the change in the physical dimensions in the turns of the coil. Because of the difference in temperature coefficients of expansion of the two rods 7 and 8, one of the rods will expand or contract a greater amount in an axial direction than the other of the two rods. This results in relative movement between the apexes of the bearing surfaces 15 and 16, which in turn causes a rotation of the shaft 12 and the conductor 6. Rotation of the closed circuited conductor 6 results in a change in the inductive coupling between this conductor and the turns of the coil and a consequent change in the overall inductance of the latter. By properly calibrating the device so that a given rotation of the element 6 occurs for a given temperature change, the overall inductance value of the coil may be maintained substantially constant over wide temperature changes.

It will be seen that the calibration of the device to obtain a given amount of rotation of the closed circuited conductor 6 for a predetermined temperature variation, is determined by the location of the bearing members 10 and 11 with respect to the fixed ends of the rods 7 and 8. Thus, for example, if the members 10 and 11 are located near the free ends of the rods 7 and 8 a greater rotation of the conductor 6 results from a given temperature change of the rods than if the members 10 and 11 be located adjacent the fixed ends of the rods. By properly positioning the members 10 and 11, with respect to the fixed ends of the rods, the rotation caused by a predetermined temperature change may be such that the increase or decrease in the inductance value of the coil just compensate for a decrease or increase in inductance due to the rotation of the inductively coupled closed circuited conductor 6. My experiments show that, by a proper positioning of the bearing members 10 and 11 along the lengths of the two rods 7 and 8, the compensating action, caused by a change in the inductive coupling between the closed circuited conductor 6 and the turns of the coil, may be made to maintain the overall inductance value of the coil at a substantially constant value over wide temperature ranges.

There are certain particular advantages which result from the use of the compensating device described. For example, to consider the coil 2, with the compensating element 6 removed, it will be found that the inductance of the coil varies in a substantially linear relation with respect to the temperature of the coil. With element 6 present and positioned substantially as illustrated in the drawing, that is, with its plane at about a 45° angle with respect to the axis of the coil, it will be found that upon rotation of the element 6 about an axis at right angles to the axis of the coil in either direction from the position indicated, the temperature remaining constant, the inductance of the coil varies substantially linearly with the angular position of the element 6 thru a considerable range of movement of this element. Thus with such an element properly positioned within the coil, the problem of maintaining the inductance of the coil constant, irrespective of temperature variation, reduces to that of rotating the short circuit element about its axis in response to temperature, and through an angle which varies linearly with respect to the temperature variation. This may be effected to a high degree of accuracy by the means described.

The device as thus described operates to maintain the inductance of the coil constant both with respect to temperature variations produced by reason of electrical energization of the coil and by reason of ambient temperature variations. It not only maintains the inductance of the coil constant during a wide range of temperature variations of the coil, which may occur during the start-up period of the apparatus in which the coil is connected, for example, but it also compensates for the ambient temperature variations which occur after termination of the start-up period and when the apparatus is in normal operation.

The extent of variation of inductance produced by the element 6 is of course dependent upon the distance between axis 12 and member 9. Thus by variation of this distance the degree of compensation effected can be adjusted to a high degree of accuracy. While extremely accurate compensation may be effected, if desired, the coil may also be either over compensated or under compensated by simple adjustments which may readily be made after the apparatus has been constructed.

From the foregoing description of the operation it will be apparent that the position of the bearing members 10 and 11 with respect to the fixed ends of the rods 7 and 8 is important in securing the correct compensating action of the element 6. This is true because the position of the members 10 and 11 determines the amount of rotation of the element 6 and the consequent change in the inductive coupling between the element 6 and the coil corresponding to a determined temperature variation. While it is possible accurately to position the elements 10 and 11 by moving them along the rods 7 and 8 until an exactly correct position is reached, it is desirable to provide means for making the fine adjustments without removing the temperature compensating device from within the coil.

In accordance with my invention such a means is provided whereby accurate adjustments of the compensating device may be made following an approximate adjustment of the members 10 and 11 along the rods 7 and 8. This means is shown in the lower portion of Fig. 2 of the drawing as including flanged tubular members 17 and 18 extending through apertures in the member 9 and having the flanged portions thereof soldered, or otherwise secured to the member 9, as indicated at 19. The ends of the rods 7 and 8 are respectively retained in position within the tubular members 17 and 18 by the assembly comprising the springs 20 and 21, washers 22 and 23, cotter pins 24 and 25, and a pair of screws, one of which is indicated at 26, which screws are threaded into the ends of the rods 7 and 8 and have flanged portions engaging the lower ends of the tubular members 17 and 18. In order securely to retain the ends of the rods in the correct position following an adjustment of the same, a pair of caps 27 and 28 are provided which are threaded onto the ends of the tubular members 17 and 18. The internal portions of the caps 27 and 28 are provided with tapered surfaces which engage similarly tapered surfaces on the ends of members 17 and 18 and the ends of the tubular members are slotted as indicated at 29, so that when the caps are screwed onto the ends of the tubular members until the tapered surfaces engage, the ends of the rods 7 and 8 are gripped by the interior surface of the tubular members and are retained in fixed axial positions with respect to each other.

In making the desired adjustments to secure the correct compensating action the bearing members 10 and 11 are first positioned in an approximately correct position along the lengths of the rods 7 and 8 with respect to the fixed ends thereof. This adjustment is, of course, performed with the compensating device removed from the interior of the coil supporting member 1. Following such adjustment the compensating device is inserted within the member 1 and secured in position. Accurate calibration may then be obtained by unscrewing the caps 27 and 28 to release the ends of the rods 7 and 8 and turning the adjusting screws 26 to increase or decrease the lengths of the rods included between the bearing members 10 and 11 and the supporting member 9, until the correct positioning of the bearing members with respect to the member 9 is obtained. Following this adjustment the caps 27 and 28 may be tightened and the rods will be retained in their new axial positions.

It will, of course, be understood that with this arrangement an adjustment of the overall inductance value of the coil may be made by increasing or decreasing the length of one of the rods as, for example, the rod 8 included between the bearing member 11 and the support 9, until it is greater or less than the length of the rod included between the member 10 and the support 9. Such adjustment obviously causes a rotation of the conductor 6 resulting in a change in the inductive coupling between element 6 and the turns of the coil. It will be noted that in adjusting one of the rods 7 or 8 with respect to the other to change the inductance value of the coil, only a very small displacement of the one rod in an axial direction with respect to the other rod is necessary to produce a considerable movement of the element 6 because of the cooperation between the bearing members 10 and 11 and the shaft 13 upon which the element 6 is mounted. This, of course, means that the full range of adjustment of the inductance value of the coil may be covered without substantially affecting the temperature compensating action of the device.

It will be understood from the preceding paragraph that I have devised a compensating device in which two adjusting means are provided for securing the desired compensation and the desired inductance value of the coil. Thus, if it is desired to vary the degree of compensation, the bearing members 10 and 11 may be moved along the rods 7 and 8 or the rods may be moved equal amounts in the same direction with respect to the member 9 by the adjusting screws 26. If, on the other hand, it is desired to change the inductance of the coil without substantially affecting the degree of compensation, one of the rods 7 or 8 may be moved longitudinally with respect to the other by a manipulation of its associated adjusting screw 26; such relative movement causing a rotation of the conductor 6 to a new position with respect to the turns of the coil.

From the foregoing description it is apparent that repeated preliminary adjustments may be necessary before the temperature compensating device may be finally mounted within the coil supporting member 1. Accordingly it will be seen that it is desirable to employ a mounting arrangement which permits a rapid and easy removal of the device from the interior of the coil and, at the same time, permits an exact repositioning of the device after a removal thereof. To this end I provide a novel mounting arrangement whereby the mechanism may be readily removed and replaced within the coil in the exact position which it occupied before removal. This mounting structure includes a slot in each end of each of the members 9 and 14; each of the slots being arranged to engage a lug 30 mounted on the coil supporting member 1 by means of a screw 31 threaded through its associated lug. The screws 31 extend through the lugs 30 and the end of each of the screws engages a depression 32 located in the bottom of the associated slot.

With the elements of the mechanism in the position shown in Fig. 2, if it be desired to remove the same for adjusting purposes, it is only necessary to unscrew the screws 31 until the ends thereof are clear of the depressions 32 and twist the mechanism in either direction with respect to the member 1 until the slotted ends of the members 9 and 14 no longer engage the lugs 30, when the entire device may be pulled out of the member 1. A re-insertion is accomplished by the converse procedure of positioning the device within the member 1 until the slots are in alinement with the lugs 30, when the mechanism may be rotated in either direction to secure a re-engagement of the slots with the lugs, after which the screws 31 may be tightened thereby securing the mechanism in its original position.

It has been found that in high frequency installations wherein inductance coils equipped with my improved compensating device are employed, it is desirable in order to reduce losses caused by hysteresis and eddy currents induced in the rods 7 and 8 to shield the portions of the rods 7 and 8 located directly within the turns of the coil, from the field generated within the coil. Accordingly I provide a plurality of short tubular metal members 36 preferably of copper which surround the rods in the manner illustrated. Although I have shown these short tubular members as being mounted only on the rod 7, it will of course be understood that in practice a similar shielding means may be mounted on the rod 8 as well, this of course being dependent upon the materials employed and the demands of the particular application in question.

The minimizing of eddy currents in rod 7 by shielding means 36 is desirable since it tends to reduce the changes in dimensions of rod 7 produced during electrical heating of the coil 2 and further it prevents objectional electrical losses in the rod 7. Since no shielding means are shown on rod 8 eddy currents are produced therein thus enhancing the heating of this element by reason of electrical energization of the coil. This, of course, increases the expansion of this element and the extent of movement of element 6 which may be produced. This character of the device, arranged as illustrated in the drawing, is desirable particularly during the start-up period of the apparatus in which coil 2 is connected. This is obvious from the consideration that during such start-up period coil 2 may heat very rapidly to its operating temperature whereas were rod 8 heated only by heat conduction from coil 2 a considerable time interval would occur before element 8 became heated to its normal operating temperature. The effect of eddy currents in this element, however, considerably accelerates the heating of element 8 and hence causes this rod to approach its normal operating temperature at a rate approximating very closely the rate at which coil 2 approaches its operating temperature. Of course in cases where losses in rod 8 are excessive, or where it is necessary to reduce losses to a minimum, the shielding means 36 may be employed on rod 8 also.

From the foregoing description it will be apparent that I have devised an improved device for compensating inductance coils against inductance changes due to temperature variations which is of simple construction, is reliable in operation, and may be easily calibrated to secure the desired value of inductance and an exact and accurate temperature compensating action. It will further be seen that once the elements of the mechanism have been adjusted to secure the proper compensating action, faithful adherence to the adjustment over a long period of use will be obtained due to the ruggedness of the structure.

A feature of my invention which is of importance is that of locating the inductance-changing element 6 well within the turns of the coil and rotating the same to secure the desired compensation. Thus, in the central axial portion of the coil the flux density is at a maximum which, of course, means that the greatest obtainable change in the flux linking the element 6 and the greatest change in inductive coupling is obtained for a given movement of the conductor 6. It follows that a wider range of adjustment and a wider range of compensation is obtained by positioning the element 6 well within the turns of the coil in the manner stated. With such positioning of the conductor 6 it will, of course, be understood that very little change in inductance would be obtained by moving the element 6 axially of the coil since the flux linking the inductance changing element would remain substantially constant over a considerable range of movement and until an end of the coil were approached. Accordingly the most convenient method of varying the inductance by means of this element so positioned is to rotate the element within the coil in the manner described.

While I have shown a particular embodiment of my invention, it will of course be understood that I do not wish to be limited thereto since many modifications in the structure may be made, and I contemplate by the appended claims to cover all such modifications as fall within the true spirit and scope of my invention.

What I claim as new and desire to secure by Letters Patent of the United States, is:

1. A device for compensating for changes in inductance of an inductance coil due to temperature variations, said device comprising a closed circuited conductor mounted for rotation about an axis and arranged in inductive relation to said coil, means responsive to temperature variations of said coil to rotate said conductor about said axis thereby to change the inductive coupling between said conductor and said coil and to such an extent that the inductance of said coil is maintained substantially constant during said temperature variations, and means for varying the amount of rotation of said conductor resulting from a predetermined temperature variation.

2. In combination, a cylindrically formed inductance coil, a closed circuited conductor positioned well within the turns of said coil and arranged in inductively coupled relation therewith, said conductor being mounted for rotation about an axis, means responsive to temperature variations of said coil to rotate said conductor about said axis thereby to change the inductive coupling between said conductor and said coil to such an extent that the inductance of said coil is maintained substantially constant during said temperature variations, and means for varying the amount of rotation of said conductor resulting from a predetermined temperature variation.

3. A device for compensating for changes in inductance of an inductance coil due to temperature changes, said device comprising a closed circuited conductor mounted for rotation about an axis, a pair of members having different temperature coefficients of expansion, said members each being fixedly mounted at one end and having their other ends free to move in the same direction under like changes in temperature whereby relative movement between the free portions thereof occurs during temperature variations of the members, and means responsive to the relative movement between the free portions of said members for rotating said closed circuited conductor about said axis.

4. A device for compensating for changes in inductance of an inductance coil due to temperature variations comprising a closed circuited conductor mounted for rotary movement about an axis, temperature responsive means for rotating said conductor about said axis, and means for varying the amount of rotation of said conductor resulting from a predetermined temperature variation.

5. In combination, an inductance coil including a conductor supporting member having a hollow central portion, a device for compensating for changes in inductance of said inductance coil produced by temperature variations, said device including a supporting member slotted at either end, and means for detachably mounting said device within said conductor supporting member including a pair of lugs mounted on said last-named member and arranged to extend within the slotted end portions of said supporting member when said device is inserted within said conductor supporting member and rotated.

6. In combination, an inductance coil, a closed circuited conductor mounted for rotation in inductively coupled relation with said coil, means including a pair of metal rods having different temperature coefficients of expansion mounted within said coil for rotating said conductor in response to temperature changes, and means for shielding said rods from the magnetic field generated within said coil.

7. In combination, an inductance coil including a coil supporting member having a hollow central portion, a closed circuited conductor mounted in inductive coupled relation with said coil and arranged for rotation within said member, means including a pair of metal rods having different temperature coefficients of expansion and mounted within said member for rotating said conductor in response to temperature changes thereby to change the inductive coupling between said conductor and said coil, and means for shielding said rods from the magnetic field generated within said coil.

8. In combination, an inductance coil including a coil supporting member having a hollow central portion, a closed circuited conductor mounted in inductively coupled relation with said coil and arranged for rotation within said member, means including a pair of metal rods having different temperature coefficients of expansion and mounted within said member for rotating said conductor in response to temperature changes thereby to change the inductive coupling between said conductor and said coil, and means including a plurality of short tubular metallic members mounted on and supported by said rods for shielding said rods from the magnetic field generated within said coils.

9. In combination, a pair of rods having different temperature coefficients of expansion, a pair of spaced supporting members, said rods each being mounted at one end on one of said supporting members and being slidable at the other end in an opening in the other of said supporting members, said rods thereby having portions thereof free to move axially different amounts in the same direction in response to like temperature changes, utilizing means responsive to relative movement between said portions of said rods, said utilizing means being movable a predetermined amount in response to a predetermined change in the temperature of said rods, and adjusting means for adjusting said utilizing means along said rods between said supporting members thereby to vary the amount of movement of said utilizing means produced by a predetermined temperature change, equal adjustments of said adjusting means producing substantially equal variations in said movement produced by said predetermined temperature change throughout a substantial range of adjustment of said adjusting means.

10. In combination, a supporting member, a pair of rods having different temperature coefficients of expansion, said rods each being mounted on said supporting member and having portions thereof free to move axially different amounts in the same direction in response to like changes in temperature, a pair of bearing members each having a bearing surface and adjustably mounted respectively one on each of said rods, a shaft having a pair of knife bearing edges, said shaft being supported by the engagement of said knife edges with said bearing surfaces and being rotatable by the displacement of said surfaces in response to relative axial movement of said rods caused by like changes in the temperature of said rods, and control means for utilizing the rotary movement of said shaft.

11. In combination, an inductance coil of cylindrical form, a closed circuit element arranged within said coil for rotation about an axis at right angles to the axis of said coil, means responsive to temperature variation of said coil to rotate said closed circuit element about said axis through such an angle that the inductance of said coil remains substantially constant during said temperature variations, and means for varying the amount of rotation of said element resulting from a predetermined temperature variation.

12. In combination, an inductance coil of cylindrical form, a short circuit element arranged within said coil for rotation about an axis at right angles to the axis of said coil, said short circuit element being so mounted as to produce linear variations of the inductance of said coil with angular variation of the position of said element about said axis, means to rotate said element through an angular distance varying linearly with respect to the temperature of said coil, and means for varying the amount of rotation of said element resulting from a predetermined temperature variation.

13. In combination, an inductance coil of cylindrical form, a short circuit element arranged within said coil for rotation about an axis at right angles to the axis of said coil, the plane of said element being inclined at an approximately forty-five degree angle with respect to the axis of said coil, means responsive to the temperature of said coil to rotate said element about said axis in a direction to vary the inductance of said coil oppositely from the inductance variation produced by change in dimensions of said coil caused by said temperature variation, and means for varying the amount of rotation of said element resulting from a predetermined temperature variation.

14. A device for compensating for changes in inductance of an inductance coil due to temperature changes, said device comprising a closed circuited conductor mounted for rotation about an axis, a pair of members having different temperature coefficients of expansion, said members each being fixedly mounted at one end and having their other ends free to move under like changes in temperature whereby relative movement between the free portions thereof occurs during temperature variations of the members, means responsive to the relative movement between the free portions of said members for rotating said closed circuited conductor about said axis, and means for varying the amount of rotation of said conductor resulting from a predetermined temperature variation.

15. The combination, in a device for insertion within an inductance coil to compensate against variation in inductance of said coil with change in temperature, a short circuit element having an axial member, a pair of bearing members supporting said axial member at opposite sides thereof, the axis of said short circuit element extending between said bearing members, whereby motion of one of said bearing members with respect to the other causes rotation of said element about said axis, a pair of rods having different temperature coefficients arranged to be supported within said coil, and means to move one of said bearing members with respect to the other in accordance with the difference in change of length of said rods with temperature.

16. In combination, a pair of parallel rods having different temperature coefficients of expansion, a pair of spaced supporting members, means to secure said rods at one end thereof to one of said supporting members, said rods being slidable at the other ends thereof with respect to the other of said supporting members, a bearing member mounted on each rod and between said supporting members, a shaft supported between said bearing members, the axis of said shaft extending at right angles to the plane defined by said rods and between the points of support of said shaft by said bearing members whereby motion of one of said bearing members relative to the other in a direction lengthwise of said rods causes rotation of said shaft.

17. In combination, a pair of parallel rods having different temperature coefficients of expansion, a pair of spaced supporting members, means to secure said rods at one end thereof to one of said supporting members, said rods being slidable at the other ends thereof with respect to the other of said supporting members, a bearing member mounted on each rod and between said supporting members, a shaft supported between said bearing members, the axis of said shaft extending at right angles to the plane defined by said rods and between the points of support of said shaft by said bearing members whereby motion of one of said bearing members relative to the other in a direction lengthwise of said rods causes rotation of said shaft, and means to adjust said bearing members at different points along said rod and between said supporting members whereby the degree of rotation of said shaft caused by temperature variation may be varied.

18. In combination, a pair of parallel rods having different temperature coefficients of expansion, a pair of spaced supporting members, means to secure said rods at one end thereof to one of said supporting members, said rods being slidable at the other ends thereof with respect to the other of said supporting members, a bearing member mounted on each element, a shaft supported between said bearing members, the axis of said shaft extending at right angles to the plane defined by said rods and between the points of support of said shaft by said bearing members whereby motion of one of said bearing members relative to the other in a direction lengthwise of said rods causes rotation of said shaft, and means to adjust at least one of said rods axially thereof with respect to said first-named supporting member.

19. The combination, in a device for compensating variations in inductance of an inductance coil produced by temperature variations, a pair of parallel rods having different temperature coefficients of expansion, said rods being secured together at one point and free to move relative to each other at other points, a bearing member mounted on each element, a shaft supported between said bearing members, the axis of said shaft extending at right angles to the plane defined by said rods and between the points of support of said shaft by said bearing members whereby motion of one of said bearing members relative to the other in a direction lengthwise of said rods causes rotation of said shaft, an inductance element arranged for rotation with said shaft, said rods, bearing members, and inductance element being secured together in a unitary assembly, and arranged to be removably secured within an inductance coil.

20. In combination, an inductance coil, a pair of parallel rods arranged within said inductance coil, said rods having different temperature coefficients of expansion, said rods being subjected to expansion produced by heat received by conduction from said coil and by reason of heat produced by currents set up in said rod by reason of the magnetic field of said coil, means to shield from said magnetic field that one of said rods having the lower temperature coefficient of expansion thereby to reduce said currents in said one of said rods, and means responsive to different degrees of expansion of said rods to reduce the inductance of said coil.

21. In combination, an inductance coil, a pair of parallel rods arranged within said inductance coil, said rods having different temperature coefficients of expansion, said rods being subjected to expansion produced by heat received by conduction from said coil and by reason of heat produced by currents set up in said rods by reason of the magnetic field of said coil, means to shield at least one of said rods from said magnetic field thereby to reduce said currents, and means responsive to different degrees of expansion of said rods to reduce the inductance of said coil.

22. A device for compensating for variations in inductance of an inductance coil due to temperature variations, said device comprising a closed circuited conductor coupled with said coil and mounted for rotation about an axis parallel with the plane of said conductor and at right angles to an axis of said coil, means responsive to temperature variations for rotating said conductor about said axis and through such an angle as to correct for variations in inductance of said coil produced by said temperature variations, said means being responsive to both ambient temperature variations and temperature variations produced by energization of said coil to effect said correction, and means for varying the amount of rotation of said conductor resulting from a predetermined temperature variation.

EDWARD A. LEACH.